United States Patent Office 3,632,770
Patented Jan. 4, 1972

3,632,770
CONTROL OF PHYTOPATHOGENIC FUNGI AND BACTERIA BY TETRABUTYLDICHLOROSTANNOXANE
Glentworth Lamb, Trenton, N.J., assignor to American Cyanamid Company, Stamford, Conn.
No Drawing. Filed Mar. 20, 1969, Ser. No. 809,013
Int. Cl. A01n 9/24, 9/30
U.S. Cl. 424—288                                5 Claims

ABSTRACT OF THE DISCLOSURE

A method for the control of bacteria and fungi is given whereby an effective amount of tetrabutyldichlorostannoxane is applied to said materials.

---

The present invention relates to a method for the control of bacteria and fungi. More particularly, the present invention pertains to a method for protecting agronomic crops, produce, organic materials and the like from bacterial and fungal attack. A further aspect of this invention relates to the prevention or inhibiting of growth and proliferation of bacteria and fungi in industrial waters.

A variety of organic compounds are known and available which have biocidal activity. Organotin compounds are available in many varieties and the literature for such compounds suggests a multiplicity of uses for particular compounds encompassed by this term. Among the more frequently mentioned utilities are the use of such compounds as catalysts for the preparation of the elastomeric polyurethane foams and as ultraviolet stabilizers for plastics and resins. It is suggested, moreover, in U.S. Pat. 3,083,217, issued Mar. 26, 1963 to Albert K. Sawyer et al., that tetra-substituted diacyloxyditin compounds may have biocidal activity.

Most organotin compounds are however highly phytotoxic when applied at concentrations effective for controlling plant pathogenic bacteria and fungi and this has been found especially true for the tetra-substituted diacyloxy-di-tin compounds. Additionally, these organotin compounds have been found virtually ineffective when employed at the lower non-phytotoxic concentration rates. Thus they have been unacceptable for use as bactericides in agronomic crops, produce or the like. It is for this reason that these compounds have failed to meet with acceptance by the agricultural industry.

It is an object of this invention to provide compounds which have biocidal activity. It is another object of this invention to use an organotin compound as a bactericide or fungicide which is not phytotoxic. Other objects of this invention will become apparent to those skilled in the art from the ensuing description.

As mentioned above, tetra-substituted organotin compounds are generally phytotoxic and thus unsatisfactory at fungicidal and bactericidal rates. It has surprisingly been found, however, that a select tetra-substituted organotin, tetrabutyldichlorostannoxane, can be effectively employed for the control of phytopathogenic bacteria and fungi and is non-phytotoxic at acceptable fungicidal and bactericidal rates.

Tetrabutyldichlorostannoxane, which is also known as oxybis(dibutylchlorotin) has the formula of

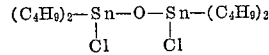

and was first described in British Pat. 711,564 issued July 7, 1954. According to that patent, a mixture of dibutyltin oxide and dibutyltin chloride fused at 110° C. becomes a homogeneous liquid. This melt solidifies on cooling and subsequently can be recrystallized from an aqueous alcoholic solution to yield a white crystalline product which is tetrabutyldichlorostannoxane. Another method for preparation includes bubbling oxygen through a mixture of dibutyltin dihydride and dibutylditin dichloride. This second method is described by A. J. Gibbons et al. in Volume 26 of the Journal of Organic Chemistry at pages 2304–2306.

In accordance with this invention, tetrabutyldichlorostannoxane has been found to be very effective in the control of bacteria and fungi. The uniqueness of this select organotin compound is more surprising in the finding that tetrabutyldichlorostannoxane may be safely applied to live plants as well as other materials at a rate of well over ten times that necessary to provide effective control of phytopathogenic bacteria and fungi.

A few of the many applications to which this invention pertains includes the protection of agronomic crops such as field crops, fruits, vegetables, ornamentals and the like, harvested produce, textiles, fabrics and similar organic materials, and industrial fluids such as process water and drilling muds. These materials may be protected from the deleterious effects of bacteria and fungi by applying to said material, produce or crops and to their general environment a small but effective amount of tetrabutyldichlorostannoxane. Treatment of industrial fluids differs only slightly from the above in that tetrabutyldichlorostannoxane is dispersed in said fluid to inhibit or retard the growth of the bacteria and fungi in the fluid.

Although tetrabutyldichlorostannoxane may be used alone or in admixture with solid or liquid diluents, it is preferable to formulate said compound as a dust, dust concentrate, wettable powder, emulsifiable concentrate or the like which is readily applied with conventional dusting or spraying equipment.

A preferred way for preparing tetrabutyldichlorostannoxane for general use includes dilute dusts and dust concentrates which are usually prepared by blending from about 1% to about 5% or from 20% to about 50%, respectively, by weight of toxicant with a finely ground inert solid carrier such as attapulgite, kaolin, talc or diatomaceous earth. Wettable powders are prepared in a similar manner by blending from about 20% to about 50% by weight of the toxic active ingredient with the inert solid carrier. To improve the dispersibility characteristics of the formulation, 1% to 10% by weight of a dispersant such as sodium lignosulfate or the monocalcium salt of polymerized alkylaryl sulfonic acid may be added. Wetting agents and deposit builders may also be added to the formulation, if desired.

Emulsifiable concentrates can be prepared by dissolving from about 25% to about 75% by weight of the active ingredient in an organic solvent such as methylisobutyl ketone, cyclohexanone or xylene, for example, with about 1% to about 10% by weight of an emulsifier, such as an anionic-nonionic blend (e.g., alkylarylsulfonate plus alkylphenolethylene oxide adduct).

For ease of application, the concentrate or emulsifiable concentrate may be dispersed in water or other inexpensive solvent such as, for example, deodorized kerosene or fuel oil. This solution may then be applied as a dilute solution, suspension or dispersion.

In practice it has been found that from about 0.25 to about 2 pounds of active ingredient per 100 gallons of solution applied at the rate of from about 100 to about 400 gallons per acre is effective for protecting crops against attack from pathogenic fungi and bacteria.

It has also been found that about 100 to about 2400 parts per million of tetrabutyldichlorostannoxane is usually satisfactory for control of bacteria and fungi in industrial fluids and from about 75 to 1200 parts per million of said compound is effective for protecting produce, textiles, fabrics and the like from the deleterious effects of said organisms.

In order that the present invention may be more fully understood, the following examples are set forth by way of illustration. No specific details or enumerations contained therein should be construed as limitations on the present invention excepting so far as they appear in the appended claims.

EXAMPLE 1

Tetrabutyldichlorostannoxane is added to separate test tubes of deionized sterile water at the rate of 100 parts per million final concentration. The treated tubes are then inoculated with one drop of 24 hour broth cultures of *Aerobacter aerogenes, Staphylococcus aureus,* and *Xanthomonas vesicatoria.* The tubes are then incubated for 24 hours at room temperature. At the end of 24 hours, 1.1 milliliters of sterile peptone broth is added to the tubes aseptically and the tubes are incubated at 37° C. for 24 hours. At the end of 24 hours all tubes are clear so subcultures are made to new untreated tubes of sterile peptone and these incubated 72 hours at 37° C. There is now growth in the subcultures of *Aerobacter aerogenes* and *Staphylococcus aureus* at the end of this period, indicating that these organisms were killed. The *Xanthomonas vesicatoria* subculture is turbid, indicating that this organism was in a state of stasis.

EXAMPLE 2

The efficiency of tetrabutyldichlorostannoxane was tested against cucumber anthracnose and tomato late blight. Jiffy flats are interplanted with Bonny Best tomato plants and Early Marketer cucumber plants with at least two true leaves per plant. These were then treated with 1200 parts per million, 600 parts per million, 300 parts per million, 150 parts per million and 75 parts per million of the test compound dissolved in 50 parts acetone and 50 parts water by spraying the foliage to run-off. The treated flats were then allowed to dry before being inoculated with a mixed inoculum of *Colletotrichum lagenarium* (anthracnose) and *Phytophthora infestans* (blight). The inoculated plants were then placed in a constant temperature cabinet at 62° F. and a saturated humidity for a period of four days. At the end of this time, the plants were removed to the greenhouse and observations were made seven days after treatment. The observations are recorded in Table I below.

TABLE I

| Inoculant | Parts per million | | | | |
|---|---|---|---|---|---|
| | 1,200 | 600 | 300 | 150 | 75 |
| *C. lagenarium* | Clean. | Clean. | Trace. | Trace. | Moderate. |
| *P. infestans* | do | do | Clean. | Clean. | Clean. |

EXAMPLE 3

The compound tetrabutyldichlorostannoxane was formulated as a two-pound gallon emulsifiable concentrate containing 25% tetrabutyldichlorostannoxane, 9% triton-155 surface active agent, and 66% xylene. The formulation had a specific gravity of 0.98 and was used to spray outdoor field plots of apple trees. Eight applications of the emulsifiable concentrate were applied to the six trees tested at a rate of 1 lb./100 gallons of solution. The six trees were then re-tested by eight applications with a rate of ½ lb./100 gallons of solution. No phytotoxicity was noted on any tree at any rate. It should be noted that one pound per 100 gallons is equivalent to approximately 1200 parts per million and ½ lb./100 gallons is equivalent to approximately 600 parts per million of active ingredients.

What is claimed is:

1. A method for the control of bacteria and fungi comprising contacting said bacteria and fungi with a bactericidal-fungicidal amount of tetrabutyldichlorostannoxane.

2. The method of claim 1 wherein from about 75 p.p.m. to about 1200 p.p.m. of tetrabutyldichlorostannoxane is employed.

3. The method of claim 1 whereby the control occurs on living plants.

4. The method of claim 1 whereby the control occurs on agronomic crops selected from the group consisting of growing and harvested field crops, fruits, vegetables, and ornamentals.

5. The method of claim 4 wherein tetrabutyldichlorostannoxane is applied to said agronomic crops at the rate of from about about 0.25 to 8 pounds per acre.

References Cited

UNITED STATES PATENTS

| | | | |
|---|---|---|---|
| 3,083,217 | 3/1963 | Sawyer et al. | 260—414 |
| 3,113,069 | 12/1963 | Sijpesteijn et al. | 424—288 |
| 3,226,292 | 12/1965 | Shaver | 424—288 |
| 3,328,239 | 6/1967 | Baum et al. | 424—288 |

FOREIGN PATENTS 711,564 7/1954 Great Britain.

OTHER REFERENCES

J. of Organic Chemistry, vol. 26, pp. 2304–06 (1960), Gibbons et al.

JEROME D. GOLDBERG, Primary Examiner

L. SCHENKMAN, Assistant Examiner